Dec. 4, 1962

I. M. DAVIDSON 3,066,894

AIRCRAFT STABILISING SYSTEM

Filed Aug. 7, 1961

Inventor
Ivor Macaulay Davidson
By
Stevens, Davis, Miller & Mosher Attorneys

United States Patent Office 3,066,894
Patented Dec. 4, 1962

3,066,894
AIRCRAFT STABILISING SYSTEM
Ivor Macaulay Davidson, Farnborough, England, assignor to Power Jets (Research and Development) Limited, London, England, a British company
Filed Aug. 7, 1961, Ser. No. 129,746
Claims priority, application Great Britain Aug. 16, 1960
19 Claims. (Cl. 244—76)

The present invention is concerned with the stabilisation of aircraft in flight.

The lift on an aircraft wing is made up of components due to incidence, camber and trailing edge lift control devices such as wing flaps. These components act substantially at the quarter-chord point, the position of maximum camber and the mid-chord point respectively, and it is the usual practice at the present time to so design the aircraft that the resultant lift force acts through a centre of lift between the quarter- and mid-chord points, the aircraft centre of gravity being located substantially at the centre of lift.

It has also been proposed that an aircraft should be designed to fly at substantially zero incidence, the aicraft weight being sustained entirely by the lift due to the trailing edge lift control devices and possibly camber. In this case the centre of lift, through which the resultant lift force acts, and hence the centre of gravity are both substantially at the mid-chord point.

It will be appreciated that in both of the arrangements referred to above an up- or downgust encountered by the aircraft will give rise to an incidence lift force on the wing applied at the quarter-chord point which is regarded as the aerodynamic centre of the wing, and such an indicence lift force, being applied forward of the aircraft centre of gravity, will give rise to a pitching moment tending to overturn the aircraft. It is therefore necessary to provide the aircraft with a tailplane of such a size as to bring the aerodynamic centre of the whole aircraft to a position aft of the centre of gravity, this position being usually referred to as the neutral point of the aircraft. In this way stability in the pitching plane can be achieved. However a tailplane is essentially a non-lifting surface and merely adds to the aerodynamic drag on and the weight of the aircraft. These disadvantages are particularly marked in the case of the type of aircraft referred to in the last paragraph since in such an aircraft the tailplane volume, i.e. the product of the trailplane area and its distance from the aircraft centre of gravity, must be greater than in a corresponding aircraft of more conventional design.

Various forms of tail-less or flying wing aircraft are known or have been proposed, but in these aircraft the rear part of the wing itself constitutes the equivalent of a non-lifting tailplane. Moreover since the effective tail arm of such a non-lifting part of the wing is small, and the aircraft centre of gravity and the centre of lift will have to be forward of the quarter-chord point, it has even been found necessary to design this rear part of the wing with negative camber to give negative lift.

The ideal solution of the longitudinal stability problem would be the provision of a device sensitive to change of incidence due to a gust and operable to adjust lift control devices on the wings in a corrective sence to counteract the overturning moment set up by the change of incidence. However lift control devices as hitherto used are not capable of giving a sufficiently rapid response to maintain aircraft stability.

The present invention stems from the use of a system for control of the circulation around an aircraft wing of the type described in copending United States patent application Serial No. 118,327, filed June 20, 1961, in the name of the present applicant. In this system the aircraft wing has a rounded trailing edge with spanwise-extending discharge apertures in the wing surface on each side of, i.e. above and below, the trailing edge. Each aperture is arranged to discharge a fluid stream as a layer rearwardly over the wing surface towards the trailing edge and provision is made for varying the momenta, i.e. the mass flows and/or velocities, of the two streams relative to one another. In this way the position of the rear stagnation point and the lift on the wing can be varied.

According to the present invention therefore an aircraft comprises a wing having a rounded trailing edge and formed with upper and lower spanwise-extending discharge apertures in its upper and lower surfaces, each aperture being arranged to discharge a fluid stream as a layer rearwardly over the wing surface towards the trailing edge, means for varying the discharge areas of the apertures relative to one another, and means responsive to up- and downgusts on the aircraft and operable to effect a relative increase in the discharge area of the upper aperture in response to an upgust and a relative decrease in response to a downgust.

The invention further provides an aircraft with a pair of wings as aforesaid, the wing trailing edges being swept back and the apertures being divided in a spanwise sense into inboard and outboard sections, wherein the gust-responsive means is operable to effect the relative increase or decrease of dicharge area on the outboard sections of the apertures. According to a feature of the invention the gust-responsive means is also operable to effect an opposite variation of discharge area on the inboard sections of the apertures.

By throttling the fluid streams at the point of discharge it it believed that a substantially instantaneous movement of the rear stagnation point can be achieved. Thus it should be possible to adjust the circulation control lift at a greater rate than the incidence lift can be varied by a gust and stability can be maintained without the use of a tailplane. Accordingly a true flying wing aircraft becomes possible in which the whole wing area constitutes a lifting surface.

Provision may also be made for varying the discharge areas of the apertures my means of a pilot-operated control for manoeuvering the aircraft in flight.

The gust responsive means may include accelerometers gyroscopes or known gust sensing devices.

One embodiment of the invention will now be described by way of example with reference to the accompanying diagrammatic drawings of which:

Figure 1:
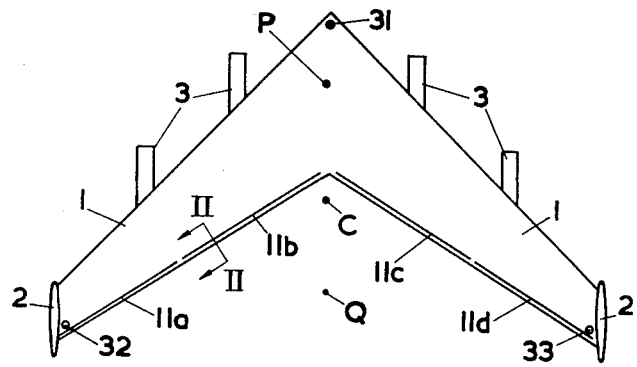
FIGURE 1 is a plan view of a "flying wing" or tailless aircraft.

The aircraft of FIGURE 1 comprises a pair of wings 1 with swept back leading and trailing edges and symmetrical with respect to the fore-and-aft centre line of the aircraft. The point C represents the wing centre of area. In the embodiment shown there is no fuselage as such though there might be a relatively small central nacelle or an unswept centre section of the wings. The wings carry vertical end plates 2 at their tips. The aircraft is powered by a number of gas turbine jet propulsion engines carried in pods 3 below the wings. Alternatively the engines could be mounted in nacelles at the wing leading edge or buried within the wings in conventional manner.

Figure 2:
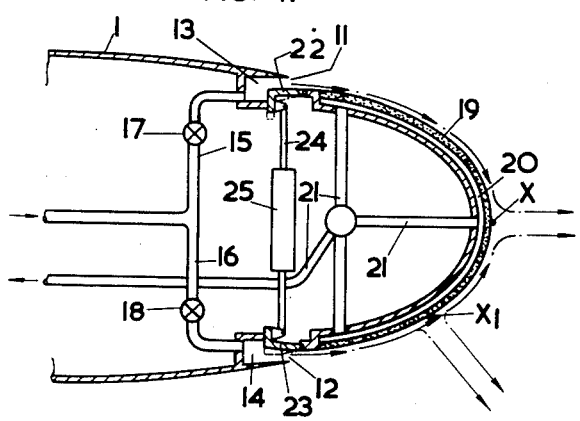
FIGURE 2 is a fore-and-aft sectional view of the rear of the aircraft wing taken on the line II—II in FIGURE 1.

Each wing of the aircraft is of substantially elliptical cross-section with a rounded or blunt trailing edge as shown in FIGURE 2, and provision is made for control of the circulation around the wing in the manner described in the above mentioned copending application. Thus each wing is formed with two similar spanwise-extending discharge apertures or slots 11, 12 in its upper and lower surfaces a short distance forward of the trailing edge. The slots open from spanwise extending manifolds 13, 14 within the wing which are connected to a source of compressed air by pipes 15, 16 incorporating control valves 17, 18. The slots face towards the wing trailing edge and are shaped to discharge air streams over the trailing edge surface 19 in the form of thin layers extending continuously along the wing span.

The rounded trailing edge surface 19 between the slots 11, 12 is made of a material suitable for the application of distributed suction to that surface, e.g., porous sintered sheet material or sheet formed with a large number of discrete holes or fine slots. A chamber 20 is provided in the wing behind this surface and is connected to a source of suction by pipes 21.

In operation the air streams from the slots 11, 12 flow over the wing surface towards the trailing edge as shown in FIGURE 2, and with the assistance of the distributed suction applied to the surface 19, tend to close up the wake which would otherwise exist behind the trailing edge. If the mass flows and velocities of the two streams are equal and the wing is at substantially zero incidence relative to the general direction of the main stream flow past the wing, i.e. the flight path of the aircraft, the rear stagnation point will be located at position X at the rearward extremity of the wing.

Provision is made for differentially throttling the two streams by varying the discharge area of the slots 11, 12. One side of each slot is accordingly defined by a hinged flap 22, 23, the flaps being connected one to each end of a control rod 24 which is movable along its axis by an actuator 25. The actuator is thereby effective to vary the discharge areas of slots 11, 12 in opposite senses. If, for example, the flaps 22, 23 are moved to the position shown in broken lines, the momentum of the stream discharged from the upper slot 11 is increased while the momentum of the stream discharged from the lower slot 12 is decreased and the rear stagnation point is moved to a position such as $X_1$ below the trailing edge whereby the wing lift is increased. Thus by differential variation of the discharge areas of slots 11, 12, the rear stagnation point can be located at a desired position on the rounded trailing edge surface 19, and the circulation around and the lift on the wing adjusted at will.

It is intended that the centre of gravity of the aircraft shall be substantially at the wing centre of area C, and that the aircraft shall cruise at substantially zero incidence of the wings. There is then no component of lift due to incidence. The areas of the slots 11, 12 are adjusted so that the rear stagnation point is stabilised at a datum position slightly towards the lower surface of the wing rather than at the rearward extremity thereof so that sufficient lift is generated to sustain the aircraft, this lift being applied substantially at the centre of area C.

Alternatively the wings could be cambered with the maximum camber at or in the region of the mid-chord point, the camber being such as to generate sufficient lift to sustain the aircraft in crusing flight. Such camber lift would again be applied at the wing centre of area C, and the datum position of the rear stagnation point would then be substantially at the rearward extremity of the wing.

Figure 3:
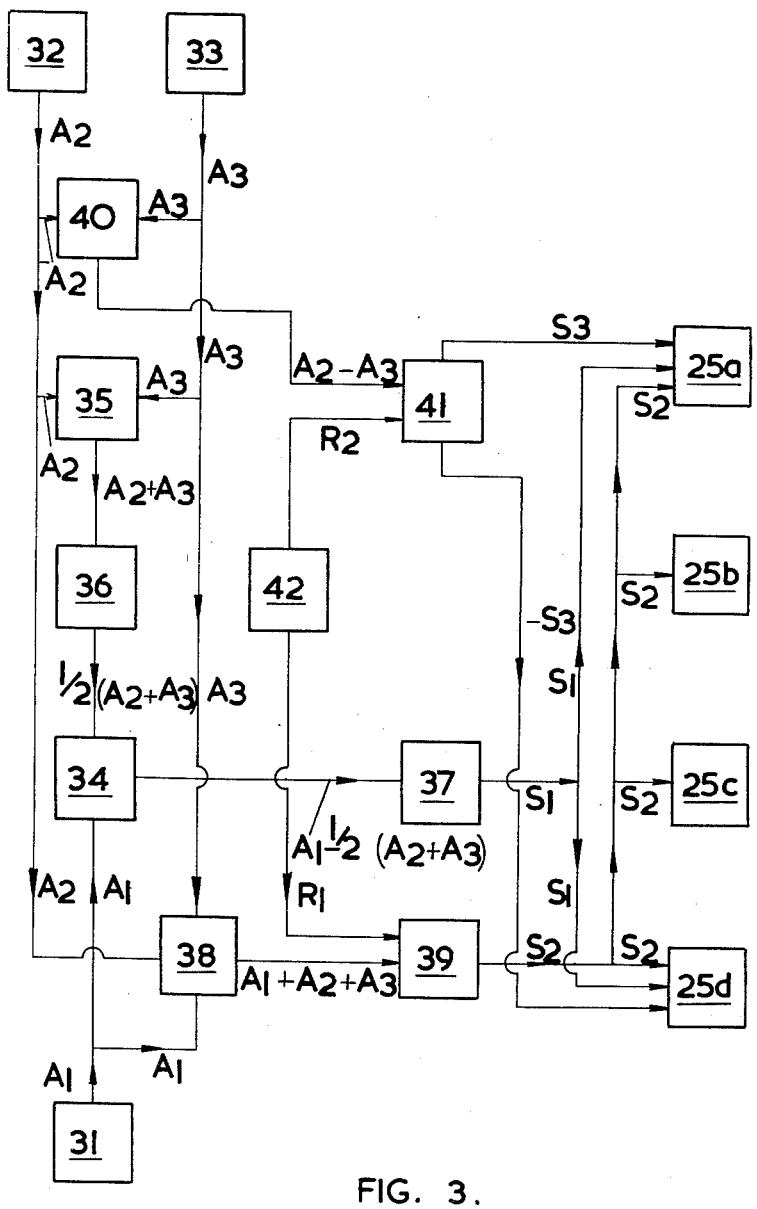
FIGURE 3 is a block diagram of the aircraft flying control and stabilisation system.

The control system of the aircraft is shown in block diagram form in FIGURE 3. It will first be mentioned however that while the slots 11, 12 extend continuously along substantially the full span of each wing, each slot is divided in a spanwise sense into inboard and outboard sections. Thus in FIGURE 1, the upper slots 11 are shown as being divided into port outboard and inboard sections 11a, 11b and starboard inboard and outboard sections 11c, 11d while the slots 12 are similarly divided. There is a separate area control flap 22, 23 for each section so that the areas of adjacent sections can be varied differentially, and four corresponding actuators 25.

In FIGURE 3 the four actuators for the port outboard, port inboard, starboard inboard and starboard outboard sections of the slots 11, 12 are shown at 25a, 25b, 25c, 25d respectively. Automatic stability is achieved by the use of three linear accelerometers 31, 32, 33 positioned as shown in FIGURE 1 at the nose of the aircraft and at the port and starboard wing tips respectively and arranged so as to detect vertical acceleration. The nose accelerometer 31 is connected to apply its output signal $A_1$ to a comparator 34, while the wing tip accelerometers 32, 33 are connected to apply their output signals $A_2$, $A_3$, to an adder 35. This adds the signals $A_2$ and $A_3$ and is connected to apply the total signal $A_2+A_3$ to a divider 36, the output signal of which is equivalent to $\frac{1}{2}(A_2+A_3)$ and is applied to the comparator 34.

In cruising flight the signal $A_1$ is equal to the signal $\frac{1}{2}(A_2+A_3)$ and so there is no output from the comparator 34. However should the aircraft encounter, for example, an upgust, a incidence lift force is generated on the wings, this force being applied at a point P forward of the wing centre of area C, approximately corresponding to the quarter chord point of the standard mean chord. This lift force sets up a nose-up pitching moment tending to increase the wing incidence and to overturn the aircraft. The resultant angular acceleration gives rise to differential accelerometer signals and a difference signal $A_1 - \frac{1}{2}(A_2+A_3)$ is applied by the comparator 34 to a signal generator 37. This operates to apply a control signal $S_1$ to the outboard actuators 25a, 25d whereby the latter vary the areas of the outboard sections of the slots in a sense to move the rear stagnation point away from the datum position towards the wing lower surface. The lift on the outboard sections of the wings is thereby increased, and on account of the swept-back configuration of the wings, the additional lift force is applied at a point such as Q to the rear of the wing centre of area. A nose-down pitching moment is thereby set up to balance the nose-up pitching moment due to the upgust, and stability of the aircraft in pitch is maintained.

It will be seen that the slot area adjustment just described will give rise to an increase in the total lift on the wing and hence to an upwardly directed acceleration causing the aircraft to rise bodily. To counteract this bodily acceleration the output signals $A_1$, $A_2$, $A_3$ of the three accelerometers are also applied to an adder 38 and the total signal $A_1+A_2+A_3$ is applied to a second signal generator 39. This operates to apply a control signal $S_2$ to all four actuators 25a, 25b, 25c, 25d whereby the slot areas of both the inboard and outboard sections are varied in a sense to move the rear stagnation point towards the upper surface and hence reduce the lift. Thus the overall effect of the control system is to vary the slot areas of the inboard and outboard sections in opposite senses so that there is no change in total wing lift and so that the nose-up pitching moment due to the upgust is balanced by the nose-down pitching moment due to the increase of lift on the outboard sections of the wings.

Similarly stability can be maintained in the event of the aircraft encountering a downgust, the system working in the opposite sense to apply a corrective nose-up pitching moment and a corrective increase in total wing lift.

The control system also makes provision for automatic stabilisation in the rolling plane. The output signals $A_2$, $A_3$ of the wing tip accelerometers 32, 33 are applied to a comparator 40 and in the event of a rolling moment being set up the resultant difference signal $A_2-A_3$ is applied to a third signal generator. This operates to apply opposite control signals $S_3$ and $-S_3$ to the outboard actuators 25a, 25d whereby the rear stagnation point is moved in opposite senses on the outboard sections of the wings and a corrective rolling moment applied.

It is to be noted that the width of the discharge apertures is very small relative to the wing, for example, 0.10 inch for a wing of 15–20 feet chord. In FIGURE 2 the width of the apertures has been greatly exaggerated for the sake of clarity. The air discharge velocity through the slots is high, possibly supersonic, and so the movement of the stagnation point in response to throttling of the air streams is practically instantaneous. It is known that circulation around a wing builds up very quickly, in an interval of time of the order of that required for the wing to travel through a distance equal to its own chord, and so a rapid adjustment of wing lift can be achieved. This rapid adjustment makes it possible to achieve automatic stabilisation in pitch and roll as just described.

FIGURE 3 also shows a pilot-operated control 42, i.e. the conventional control column, which is connected to apply command signals, $R_1$, $R_2$ to the signal generators 39, 41 respectively. Thus fore-and-aft movement of the column is effective to adjust the slot areas of both the inboard and outboard sections of the wings in the same sense whereby the rear stagnation point is moved and the wing lift varied. A control equivalent to the usual elevator control is thus achieved, but without any change of wing incidence. Similarly turning or sideways movement of the column is effective to move the rear stagnation point in opposite senses on the outboard sections of the wings, so giving the equivalent of aileron control. Any variations in slot area due to gusts will be superimposed on or additional to those effected by the pilot's control.

In the control system shown, the signals $A_1$, $A_2$, $A_3$ derived from the accelerometers 31, 32, 33 and the control signals $S_1$, $S_2$, $S_3$ applied to the actuators are electrical, while the actuators themselves may be electric or hydraulic. The pilot's command signals $R_1$, $R_2$ are also electrical, the pilot's control column being connected to operate potentiometers. However various combinations of electrical, mechanical and hydraulic systems are possible.

It will be understood that the control system may take many forms. Thus instead of the three linear accelerometers connected in the manner shown in FIGURE 3, there could be two angular accelerometers or two gyroscopes, one arranged to detect pitching moments, and one to detect rolling moments, together with a linear accelerometer arranged to detect bodily vertical acceleration. Again it may be possible to use known gust sensing devices such as pivoted vanes or static pressure probes mounted ahead of the aircraft. A combination of accelerometers, gyroscopes and other devices may in some circumstances be desirable.

In practice there will be a number of accelerometers, gyroscopes or other devices corrected in parallel to allow for failure of one component. It will be appreciated that very rapid responses will be required; suitable devices have been developed for use in missiles.

Other arrangements for varying the area of the discharge slots may be used. For example in one modification, the flaps 22, 23 are replaced by diaphragms of flexible material covering recesses to which hydraulic fluid is supplied. The actuator is then effective to vary the hydraulic fluid pressure to cause the diaphragms to bulge to a greater or lesser extent and hence vary the slot areas. In another modification the discharge apertures 11, 12 are of the form described in said copending application, each being constituted by a recess in the wing surface, roughly triangular in shape, with the downstream face (with respect to the general direction of the main stream flow over the wing) smoothly curved, e.g., to a circular arc, to merge smoothly into the wing surface and the other face approximately normal thereto. This other face is formed with discharge openings, e.g., in the form of a spanwise-extending row of discrete holes or a series of slits, which accordingly face rearwardly towards the wing trailing edge and in a downstream direction with respect to the main stream flow over the wing. The openings are so spaced and arranged that air jets issuing therefrom combine to form a layer extending continuously along the wing span. In some cases there may be more than one row of holes or slits. The parts of the wing upstream and downstream of the recess are continuous with one another in the sense that they conform to the original elliptical cross-section of the wing. Throttling members are provided which can be moved into or out of the holes or slits from inside the wing to vary the area of the discharge openings. Alternatively there may be shutter plates formed with holes registering with those in the faces of the recesses, the shutter plates being movable to vary the overlap of the holes to vary the effective discharge area. In any case the discharge slots in each wing are divided into inboard and outboard sections, the areas of which can be varied differentially with respect to one another in the manner already described.

Figure 4:
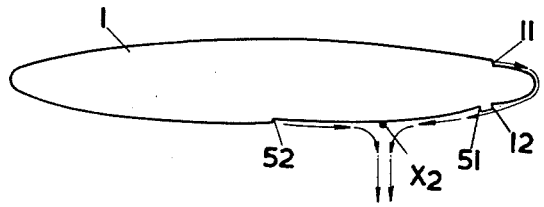
FIGURE 4 is a fore-and-aft sectional view through the aircraft wing showing an optional modification.

FIGURE 4 shows an optional modification of the aircraft already described in which each wing is provided with third and fourth discharge apertures or slots 51, 52, slot 51 being adjacent and forward of slot 12 and slot 52 being located in the wing lower surface considerably forward of the trailing edge, at approximately the mid-chord position. The slots 51, 52 are similar to slots 11, 12 and are formed to discharge layers of air over the wing lower surface forwardly and rearwardly respectively.

When a large increase in lift is required, e.g. on take-off and landing, the discharge slots 51, 52 are brought into use as described in said copending application. Thus slot 12 is closed and slot 51 opened. The streams of air discharged over the wing surface from slots 11 and 51 then reinforce one another, and flow around the wing trailing edge forwardly over the lower surface, and the rear stagnation point is moved to a position such $X_2$ on the wing lower surface, thus giving rise to a considerable increase in lift. At the same time, slot 52 is opened so that an air stream is discharged rearwardly as a layer over the wing lower surface, and by adjustment of the discharge areas of slots 51, 52, the stagnation point can be stabilised at a desired position between them, depending on the amount of lift required.

In the high lift phase of operation just referred to, it may be possible to achieve automatic stability by adjustment of the area of the outboard section of the slot 11 alone, slot 12 being closed. Alternatively provision may be made for differential adjustment of the discharge areas of the outboard sections of slots 51, 52 under the control og gyroscopes, accelerometers or other devices as described above.

The control of the airstreams discharged from the slots may be effected in part by valves such as 17, 18 in the air supply lines as described in said copending application. It is considered essential however that the automatic stabilisation system shall act on the discharge areas themselves to provide the necessary rapidity in lift variation. However the complete cutting-off of the air discharge from slot 12 and the initiation of the air discharge from slots 51, 52 could be effected by the valves as aforesaid.

The aircraft engines are preferably of the by-pass type and the compressed air for the discharge slots is taken from the by-pass streams of these engines, the air supply being as described in copending United States patent application Serial No. 7305, filed February 8, 1960, in the name of the present applicant. These compressors may also afford distributed suction at the wing trailing edge.

The end plates 2 may, like the wings, be of elliptical or similar cros-section with a rounded trailing edge and variable area discharge slots on each side of the trailing edge, provision being made for differentially controlling the area of the two slots of each plate to control the aircraft in yaw. Such control may be effected automatically by accelerometers, gyroscopes or other devices arranged to detect yawing movements of the aircraft and to maintain stability in a manner analogous to the pitch and roll control devices already described. The size of the end plates may in this way be reduced.

As mentioned above the arrangement of the aircraft is such that the centre of gravity is at the wing centre of area. However the use of the stabilising system described allows for considerable variation in the position of centre of gravity and hence in disposition of the load. If the centre of gravity is forward of the centre of area, the aircraft is flown at a positive incidence, and the areas of the outboard sections of the slots are pre-set to so locate the datum position of the stagnation point as to counteract the resultant nose-up pitching moment. Similarly if the centre of gravity is to the rear of the centre of area, the aircraft is flown at negative incidence, and the datum position of the stagnation point is adjusted accordingly.

It will be seen that in a relatively large aircraft as described above, the wings themselves will provide sufficient room to accommodate the load, and the aircraft can be a true flying wing. Practically the only source of parasitic drag will be the end plates and the pods or nacelles of the engines if these cannot be completely buried in the wing.

I claim:

1. An aircraft comprising a wing having a rounded trailing edge and formed with upper and lower spanwise-extending discharge apertures in its upper and lower surfaces, each aperture being arranged to discharge a fluid stream as a layer rearwardly over the wing surface towards the trailing edge; means for supplying fluid to said apertures; means for varying the discharge areas of the apertures relative to one another; and means responsive to up- and downgusts on the aircraft and operable to effect a relative increase in the discharge area of the upper aperture in response to an upgust and a relative decrease in response to a downgust.

2. An aircraft comprising a pair of wings having swept back and rounded trailing edges, each wing being formed with upper and lower spanwise-extending discharge apertures in its upper and lower surfaces, each aperture being arranged to discharge a fluid stream as a layer rearwardly over the wing surface towards the trailing edge and being divided in a spanwise sense into inboard and outboard sections; means for supplying fluid to said apertures; means for varying the discharge areas of the upper and lower apertures relative to one another; and means responsive to up- and downgusts on the aircraft and operable to effect a relative increase in the discharge areas of the outboard sections of the upper apertures in response to an upgust and a relative decrease in response to a downgust.

3. An aircraft according to claim 2 wherein said gust-responsive means is also operable to effect a relative decrease in the discharge areas of the inboard sections of the upper apertures in response to an upgust and a relative increase in response to a downgust.

4. An aircraft according to claim 2 wherein the gust-responsive means is also operable in response to a gust tending to produce a rolling moment on the aircraft to effect a relative increase in the discharge area of the outboard section of the upper aperture in one wing and a relative decrease of the outboard section of the upper aperture in the other wing.

5. An aircraft according to claim 4 further comprising a pilot-operated control operable to vary the discharge areas of the apertures in both wings in the same sense and also to vary the discharge areas of the outboard sections of the apertures in opposite senses.

6. An aircraft according to claim 1 wherein the gust-responsive means includes at least one accelerometer.

7. An aircraft according to claim 1 wherein the gust-responsive means includes at least two accelerometers spaced fore and aft from one another.

8. An aircraft according to claim 1 wherein the gust-responsive means includes at least one gyroscope.

9. An aircraft according to claim 4 wherein the gust-responsive means includes a gyroscope arranged to detect pitching moments and a gyroscope arranged to detect rolling moments.

10. An aircraft according to claim 1 wherein the gust-responsive means includes a pivoted vane mounted ahead of the aircraft.

11. An aircraft according to claim 1 wherein the gust-responsive means includes a static pressure probe mounted ahead of the aircraft.

12. An aircraft according to claim 1 comprising a pivoted flap defining each aperture on one side thereof and an actuator connected to the flaps so as to increase the discharge area of one aperture and to decrease the discharge area of the other aperture.

13. An aircraft according to claim 1 further comprising means for applying distributed suction to the trailing edge surface of the wing between said apertures.

14. An aircraft according to claim 1 wherein the wing is formed in its lower surface with a third spanwise-extending discharge aperture adjacent said lower aperture and arranged to discharge a fluid stream as a layer forwardly over the wing lower surface.

15. An aircraft according to claim 14 wherein the wing is formed in its lower surface with a fourth spanwise-extending discharge aperture forward of said third aperture and arranged to discharge a fluid stream as a layer rearwardly over the wing lower surface.

16. An aircraft according to claim 2 comprising vertical end plates at the wing tips.

17. An aircraft according to claim 16 wherein each end plate has a rounded trailing edge and is formed on each side of its trailing edge with discharge apertures extending along its length, each aperture being arranged to discharge a fluid stream as a layer rearwardly over the end plate surface towards the trailing edge, and further comprising means for supplying fluid to said apertures and means for varying the discharge areas of said apertures relative to one another.

18. An aircraft according to claim 17 comprising means responsive to yawing movement of the aircraft and operable to effect a relative variation of the discharge areas of said apertures in the end plates.

19. An aircraft according to claim 1 wherein the wing is substantially elliptical in cross-section.

No references cited.